United States Patent [19]

Hart

[11] Patent Number: 4,868,229

[45] Date of Patent: Sep. 19, 1989

[54] STORAGE-STABLE POLYMERIZABLE COMPOSITION

[75] Inventor: Duane H. Hart, St. Paul, Minn.

[73] Assignee: Minnesota Mining and Manufacturing Company, St. Paul, Minn.

[21] Appl. No.: 29,276

[22] Filed: Mar. 23, 1987

[51] Int. Cl.$^4$ ............................................ C08L 63/00
[52] U.S. Cl. .................................... 523/400; 524/906
[58] Field of Search .......................................... 523/400

[56] References Cited

U.S. PATENT DOCUMENTS

| | | | |
|---|---|---|---|
| 2,982,396 | 5/1961 | Shihadeh | 206/219 |
| 3,462,008 | 8/1969 | Tibbs | 206/47 |
| 4,623,702 | 11/1986 | Grieves et al. | 525/528 |
| 4,661,539 | 4/1987 | God | 523/400 |
| 4,747,517 | 5/1988 | Hart | 222/137 |

FOREIGN PATENT DOCUMENTS

| | | |
|---|---|---|
| 646446 | 4/1964 | Belgium . |
| 1065560 | 4/1967 | United Kingdom . |
| 1072272 | 6/1967 | United Kingdom . |

Primary Examiner—Lewis T. Jacobs
Attorney, Agent, or Firm—Donald M. Sell; Walter N. Kirn; James V. Lilly

[57] ABSTRACT

An extrudable epoxy resin and curing agent that polymerize when mixed are separated by an extrudable barrier layer disposed between and in contacting relationship with the epoxy resin and curing agent. The material of the barrier layer is insoluble in the epoxy resin and curing agent while being dispersible in a mixture of them. The barrier layer material is selected from hydrogenated rosin ester, terpene phenolic resin, alpha-pinene resin and polybutene. The epoxy resin, curing agent and barrier layer have sufficiently similar rheologies at the temperature at which they are to be extruded from their container to ensure against intermixing until after they emerge from the container outlet.

12 Claims, 2 Drawing Sheets

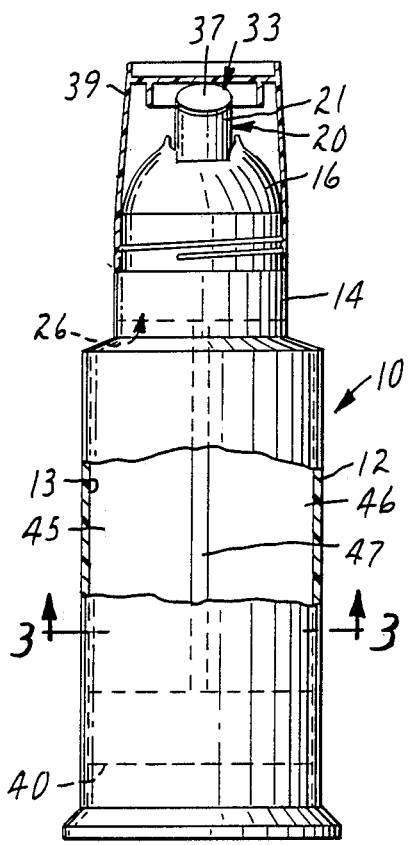
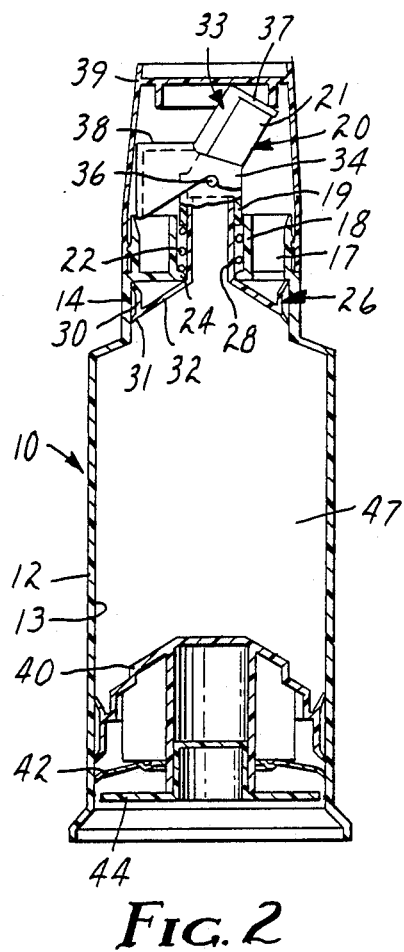
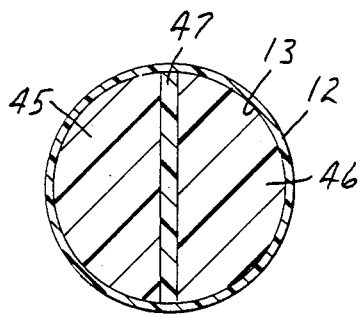
FIG. 1
FIG. 2
FIG. 3

STORAGE-STABLE POLYMERIZABLE COMPOSITION

BACKGROUND OF THE INVENTION

1. Field of the Invention

The invention concerns polymerizable compositions that can be stored in a single container.

2. Description of the Related Art

U.S. Pat. No. 2,982,396 (Shihadeh) describes a single-package composition made from two reactive materials that polymerize when mixed. The composition can be stored in a single container. The reactive materials are separated by a "substantially inert and impermeable barrier ... adapted to resist the diffusion of either reactive component into the other for relatively long periods while permitting the entire contents of the one-package system including the barrier to be stirred into a substantially homogeneous and compatible mixture" (col. 1, lines 58-64). The barrier layer can be a liquid having a viscosity and density intermediate between those of the two polymerizable materials, or can be thixotropic or a gel, or can be a low-melting solid when the reaction between the two polymerizable materials is sufficiently exothermic to melt the solid barrier. Shihadeh's compositions are apparently designed for one-time use. In other words, they are not said to be useful for incremental (i.e., partial or repetitive) dispensing from the container.

Belgian Pat. No. 646,446 (patented Apr. 10, 1964) also concerns a container in which two or more reactive ingredients are separated by a barrier material that is said to be compatible with the reactive ingredients but neither reacts wtih them separately nor significantly diminishes the properties of the final product. The contents can either be mixed in the container before being extruded, or the container can be fitted with an extrusion nozzle containing a mixing element that mixes the materials when they are extruded. The Belgian patent says nothing about incremental dispensing and intervening storage of portions of the contents of the container.

Much of what is stated in the Belgian patent is repeated in U.K. Pat. Specification Nos. 1,065,560 and 1,072,272 and U.S. Pat. Nos. 3,462,008 (Tibbs '008) and 3,519,250 (Tibbs '250). None of these latter references suggests the incremental dispensing of less than the entire contents of the container at one time.

SUMMARY OF THE INVENTION

The present invention provides a storage stable, extrudable, polymerizable composition comprising an epoxy resin, a curing agent for said epoxy resin, and a barrier layer comprising an extrudable material selected from the group consisting of hydrogenated rosin ester, terpene phenolic resin, alpha-pinene resin and polybutene, said barrier layer being disposed in separating relationship between said resin and said curing agent and in contacting relationship therewith.

The compositions of the invention can be stored in and extruded from dispensers such as squeeze tubes (e.g., steel, aluminum or plastic tubes), squeeze bottles, cartridges (e.g., cylinders for caulking guns) or pump dispensers (e.g., the "Realex HVD" dispenser from Calmar, Inc.). The compositions of the invention are sufficiently storage stable that amounts as small as one third to one tenth of the contents of the dispenser can be incrementally extruded from the dispenser at intervals separated by one week or more, without clogging of the nozzle.

Polybutene (sometimes also known as polyisobutylene) has been found to form a particularly preferred barrier layer that is much more effective than any of the barrier materials for epoxies described in Shihadeh and the other references cited above.

BRIEF DESCRIPTION OF THE DRAWINGS

In the drawing:

FIG. 1 is a front elevation, partly cut away to a central section, of a preferred dispenser for use with the invention.

FIG. 2 is a side elevation of the dispenser of FIG. 1, fully cut away to a central section;

FIG. 3 is a cross section along line 3—3 of FIG. 1;

DETAILED DESCRIPTION

Figure 4:
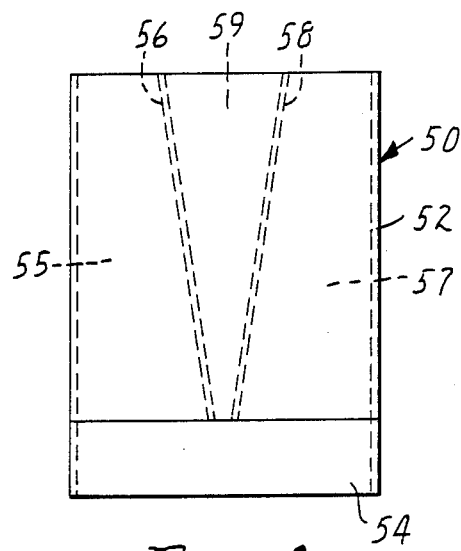
FIG. 4 is a side elevation of an injection head useful for filling the tubular cavity of the dispenser illustrated in FIGS. 1-3.

The dispenser 10 shown in FIGS. 1-3 has a molded plastic body 12, which over most of its length contains an unobstructed cylindrical cavity 13 of uniform cross section. At one end, the plastic body is formed with a cylindrical collar 14 and a partial dome 16. Webs 17 project from the internal surface of the dome 16 to support a cylindrical central neck 18. Slidably positioned within the central neck 18 is the large-diameter inlet end 19 of a nozzle 20 which also has a small-diameter outlet end 21. The large-diameter end rests against a coil spring 22 that is seated on an annular flange 24 at the end of the central neck 18 adjacent the cavity 13. A piston 26 is slidably positioned within the collar 14 and is formed with a hollow cylindrical projection 28 which fits tightly in the large-diameter end 19 of the nozzle 20. The piston wall 30 that rides against the wall of the collar 14 is slightly concave and has knife-like edges 31 in order to provide an air-tight seal. The piston surface 32 that faces the cavity 13 is substantially conical.

A lever 33 is formed with two arms 34, each having an indentation fitting over a knob 36 projecting from the large-diameter end 19 of the nozzle 20. The lever also is formed with a cap 37 which covers the outlet 21 of the nozzle 20. When a user depresses the knurled surface 38 of the lever 33, the applied pressure forces the piston 26 downwardly and simultaneously pivots the lever 33 to retract the cap 37 from the nozzle 20. When the lever is released, the coil spring 22 returns the lever 33 and its cap 37 to the position shown in FIGS. 1 and 2. An overcap 39 covers the top of the dispenser 10.

A plunger 40 is slidably positioned at the open end of the cavity 13 and is prevented from moving outwardly by a metal sunburst spring 42, the legs of which bite into the sides of the plastic body 12 to prevent the plunger 40 from moving toward the open end of the cavity. The body-contacting wall of the plunger is shaped like the piston wall 30, thus also providing an air-tight seal. A shield 44 fixed to the plunger extends substantially across the open end of the cavity 13, while leaving a small space through which air can enter or escape.

The cavity 13 has been filled with an extrudable epoxy resin 45 and curing agent 46 that polymerize when mixed together, each extending over the length of the cavity and through the extrusion outlet provided by the piston projection 28 and the nozzle 20. An extrudable barrier layer 47 made, e.g., of polybutene, extends in separating relationship between resin 45 and curing agent 46 over their full length. For brevity, the epoxy resin 45, curing agent 46 and barrier 47 will sometimes be referred to collectively hereafter as "extrudable materials".

When a user depresses the knurled surface 38 of the lever 33, the piston 26 is forced away from the extrusion outlet and against the extrudable materials 45, 46 and 47. Because the sunburst spring 42 prevents the plunger 40 from moving outwardly, the extrudable materials are forced through the nozzle 20. When the lever is released, the coil spring 22 returns the cap 37 to its original position shown in FIGS. 1 and 2, and in doing so, the cap cuts off the materials being extruded from the container 10. The coil spring 22 also returns the piston 26 to its original position, thus causing the plunger 40 to move in the same direction by virtue of the air-tight seals provided by the walls of the piston and plunger.

Figure 5:
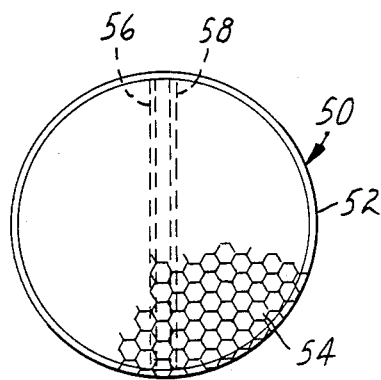
FIG. 5 is an end view of the injection head of FIG. 4.

An injection head 50 useful for filling the tubular cavity 13 of the dispenser 10 is illustrated in FIGS. 4-5. The injection head has a cylindrical tube 52 which fits loosely within the cavity 13. in one end of the cylindrical tube is sealed a honeycomb 54 formed with numerous axial channels of substantially equal size. Excellent results have been achieved when each channel of the honeycomb was about 3 mm in diameter. The injection head is further described in my copending application Ser. No. 029,431, filed of even date herewith, now U.S. Pat. No. 4,789,012, issued 06 Dec. 1988, the disclosure of which is incorporated herein by reference.

Sealed to the honeycomb and to the internal surface of the cylidrical tube 52 are two thin walls 56 and 58 which are flat and subdivide the hollow of the cylindrical tube into (1) a first compartment 55 including a first contiguous set of said honeycomb channels, (2) a second compartment 57 including a second contiguous set of said honeycomb channels, and (3) a third central compartment 59 including a third contiguous set of said honeycomb channels, the third set being only one channel in width. Each of the first, second and third compartments is connected (using appropriate tubular conduits and connectors) to a supply of extrudable material under pressure. Flow of the extrudable materials into the compartments is controlled using a suitable valve, pressure control or other conventional fluid handling means to enable simultaneous injection of the polymerizable materials into the compartments.

The walls 56 and 58 of the injection head are canted so that all three compartments are of substantially equal volume. This serves to equalize back pressure when the extrudable materials 45, 46 and 47 are extruded through the honeycomb 54 to fill the dispenser 10.

The injection head 50 promotes a laminar flow of the extrudable materials, thus discouraging any substantial intermixing during the filling operation. The honeycomb 54 also permits a filled dispenser to be removed from the injection head 50 and the filling of the next dispenser commenced without any intervening cleanup.

Figure 6:
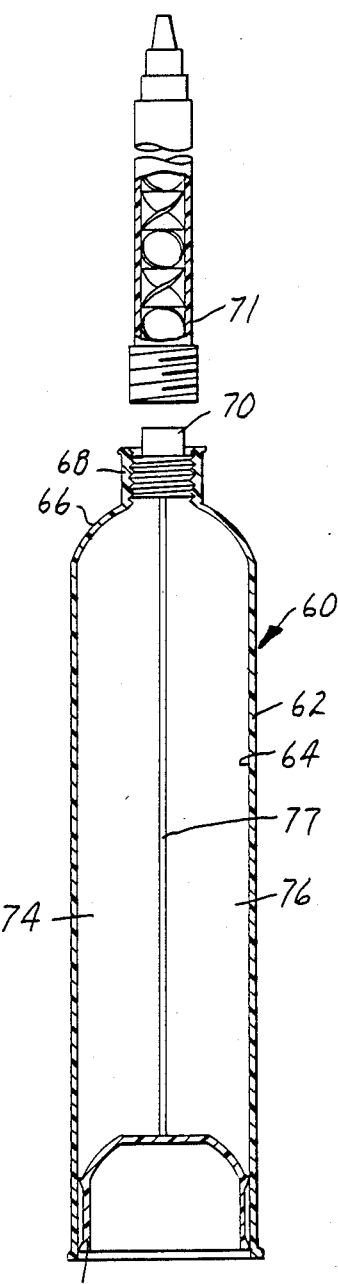
FIG. 6 is a cross section through a second dispenser for use with the invention.

Unlike the dispenser 10 of FIGS. 1-3 which includes means for driving its piston to dispense the extrudable materials, the dispenser 60 shown in FIG. 6 is designed for use in a conventional caulking gun (not shown). The dispenser 60 has a molded plastic body 62 which contains an unobstructed cylindrical cavity 64 of uniform cross section that terminates in a dome 66 and a collar 68. The collar is internally threaded or otherwise equipped to receive either a plug 70 or a conventional static mixing nozzle 71.

Into the open end of the cavity 64 is fitted a piston 72, the wall of which is shaped like the piston wall 30 of dispenser 10 to provide an air-tight seal. The cavity 64 has been filled with extrudable epoxy resin 74 and curing agent 76 that polymerize when mixed together and an extrudable barrier layer 77 that is situated between resin 74 and curing agent 76 and extends throughout the length of the cavity and the extrusion outlet provided by the collar 68. The backside of the piston 72 is shaped to receive the standard driving element of a conventional caulking gun in order to be driven from the open end of the cavity toward the extrusion outlet and dispense the extrudable materials 74, 76 and 77 through the collar 68.

Between uses, the filled static mixing nozzle 71 can be left attached to the dispenser 60, to be thrown away and replaced with a new (empty) static mixing nozzle at the time of the next use. Alternatively, the plug 70 can be reinserted in the outlet of the dispenser 60. Because a threaded plug would tend to stir the extrudable materials adjacent its inner face, it is preferred to use an unthreaded sliding plug that is keyed or labeled to provide the same orientation each time it is reinserted.

In the dispensers illustrated in the drawing, the epoxy resin and curing agent are separately disposed in semicircular regions within the dispenser. Additional materials that are copolymerizable with the epoxy resin can be disposed within the dispenser. Individual extrudable copolymerizable materials can each be disposed in more than one region, with an extrudable barrier layer between adjacent copolymerizable materials or regions of copolymerizable materials. Additional barrier layers of dissimilar materials can be used if desired. The copolymerizable materials can be separated coaxially by a cylindrical barrier. Preferably, the barrier layer or layers lie substantially in a plane that intersects the sidewall of the tubular cavity. The tubular cavity is preferably circular in cross-section, but if desired can have other shapes (e.g., rectangular, square or oval).

Mixing of the extrudable materials is enhanced when the resin and curing agent are of substantially equal volume. When these materials are not approximately equal in volume, it may be desirable to discard the first and last portions extruded from the dispenser, the proportions of which might be out of specification.

Expressed on a numerical basis, the viscosities of each of the extrudable materials at the desired dispensing temperature and shear rate preferably differ from one another by no more than about 20 percent, more preferably about 10 percent. Preferably the densities of each of the extrudable materials are sufficiently similar at all temperatures to which the dispenser will be exposed during shipment and storage, so that the contents of the dispenser behave substantially like a single fluid and thus stay in position when jostled. Expressed on a numerical basis, the above-mentioned densities preferably do not differ by more than about 5 percent, more preferably about 1 percent.

For utmost convenience of use, the contents of the dispenser should be formulated to be dispensed at ordinary room temperature. However, by heating the contents of the dispenser each time it is used, the contents can be of very high viscosity at ordinary room temperatures. This also tends to enhance long-term storage stability of each of the extrudable materials.

Whether or not the contents of the dispenser are to be dispensed incrementally at room temperature, each of the extrudable materials preferably is formulated to have a sufficiently high yield point at the anticipated storage temperature so that none of the extrudable materials is displaced due to gravity or forces encountered in shipping or handling. Thus, it is preferred to blend one or more thixotropic agents with each of the extrudable materials so that the contents of the dispenser tend to stay in the position in which they have been loaded into the dispenser, while also affording low resistance to being dispensed.

Epoxy resins and curing agents that can be used in the invention will be familiar to those skilled in the art, reference being made to typical epoxy adhesives, sealants and molding compounds, and the Shihadeh, Belgian patent, Tibbs '008 and Tibbs '250 references mentioned above. It should be noted however that it is desirable to adjust the epoxy resin and curing agent to provide more equivalent rheologies for epoxy resin and curing agent than are shown in those references.

By "equivalent rheologies" is meant that the epoxy resin and curing agent have sufficiently similar viscosities at the intended temperature and shear rate at which they are to be dispensed so that the contents of the dispenser can be incrementally dispensed without clogging of the nozzle.

The barrier layer can be made from polybutenes, hydrogenated rosin esters, terpene phenolic resins or alpha-pinene resins, or mixtures thereof. The barrier layer should be insoluble in the epoxy resin and curing agent while being dispersible in a mixture of them. Polybutenes are a particularly preferred material for the barrier layer. Polybutenes have been found to provide especially good storage stability when used with fast curing epoxies. Polybutenes are available commercially over a large range of viscosities and, by selecting one or more of these and blending with a thixotropic agent, the rheology of the barrier layer can be readily matched to the rheologies of the epoxy resin and curing agent. The rheology of the barrier layer can also be adjusted, if desired, by blending two or more barrier layer materials of appropriate viscosities or by adding a suitable nonreactive organic fluid such as butyl benzyl phthalate or mineral oil.

Each of the extrudable materials can include surfactants, wetting aids, pigments, inorganic or organic extending or reinforcing fillers, solvents, diluents, and other adjuvants of the type customarily employed in polymerizable materials. If fillers are employed, it has been found to be desirable to employ substantially similar volume percentages of filler in each of the extrudable materials as this aids in matching their rheologies. Preferred inorganic fillers include quartz, fumed silica, titanium dioxide, calcium carbonate, barium sulfate, metal oxides such as iron oxide, and glass beads and bubbles. Preferred organic fillers include carbon black and finely divided polymers such as polyethylene, polyamide, and other engineering plastics.

In the following examples, all parts are by weight. EXAMPLES 1-4 disclose several suggested compositions of the invention. For optimum results, their viscosities preferably would be adjusted to be even more nearly equal than achieved in the examples. Their densities (which were not measured) preferably would likewise be adjusted. COMPARATIVE EXAMPLES 5-10 reproduce as closely as possible those examples of the Shihadeh patent that employ currently available barrier layer materials and were deemed to be most likely to be comparable to the compositions of the invention. Those examples in Shihadah that employed barrier materials (e.g., PCBs) that are no longer sold were not reproduced. EXAMPLES 11-13 disclose particularly preferred compositions of the invention, and tests on incremental portions extruded from dispensers containing those compositions.

Viscosities reported in the examples were measured at 25° C. with a model DMK 500 Haake viscometer equipped with a "PK-I" 0.3° cone, rotated at 4 rpm unless otherwise noted.

EXAMPLE 1

| | Parts |
|---|---|
| Curing agent (Component A), viscosity 18,404 cps: | |
| Polymercaptan resin ("Capcure" 3-800, Diamond Shamrock) | 88.43 |
| Tris(2,4,6-dimethylaminomethyl)phenol ("DMP-30", Rohm & Haas) | 9.82 |
| Fumed silica ("Cab-O-Sil" TS-720, Cabot) | 1.75 |
| Base (Component B), viscosity 18,923 cps: | |
| Epoxy resin ("Epon" 828, Shell Chemical) | 98.0 |
| Fumed silica | 2.0 |
| Barrier (Component C), viscosity 24,434 cps: | |
| Hydrogenated rosin ester ("Foral" 105, Hercules) | 12.0 |
| Butyl benzyl phthalate ("Santicizer" 160, Monsanto) | 12.0 |
| Fumed silica | 1.0 |

Each component was stirred slowly by hand and then stirred with a motorized stirrer operated at about 3000 rpm for 3 minutes, followed by degassing under >25 mm Hg vacuum.

Test specimens were prepared by depositing a 25.4 mm deep layer of Component B in the bottom of a glass vial 23 mm in diameter, covering it with a 2.5 mm deep layer of Component C, followed by a 25.4 mm deep layer of Component A. The vial was capped, then aged at 49° C. in a circulating air oven. After 3 weeks at 49° C., no skin had formed, the three components remained miscible, and inspection with a probe showed no evidence of curing.

EXAMPLE 2

| | Parts |
|---|---|
| Components A and B as in EXAMPLE 1 | |
| Barrier (Component C), viscosity 16,428 cps: | |
| Terpene phenolic resin (SP-560, Schenectady Chemicals) | 9.3 |
| Butyl benzyl phthalate | 14.7 |
| Fumed silica | 1.0 |

Samples and test specimens were prepared as in EXAMPLE 1. After 3 weeks at 49° C. no skin had formed, the three components remained miscible, and inspection with a probe showed no evidence of curing.

EXAMPLE 3

| | Parts |
|---|---|
| Components A and B as in EXAMPLE 1 | |
| Barrier (Component C), viscosity 25,474 cps: | |
| Polyalpha-pinene resin ("Piccolyte" | 10.7 |

-continued

| | Parts |
|---|---|
| A-135, Hercules) | |
| Mineral oil (21 USP white mineral oil, Amoco Chemical) | 13.3 |
| Fumed Silica | 1.0 |

Samples and test specimens were prepared as in EXAMPLE 1. After 3 weeks at 49° C., no skin had formed, the three components remained miscible, and inspection with a probe showed no evidence of curing.

EXAMPLE 4

| | Parts |
|---|---|
| Curing agent (Component A), viscosity 18,196 cps: | |
| Polyamide resin ("Versamide" 140, General Mills) | 70 |
| Base (Component B), viscosity 17,156 cps: | |
| Epoxy resin ("Epon" 828) | 100 |
| Silicon dioxide ("Imsil" A-25, Illinois Minerals) | 70 |
| Barium sulfate (No. 22 barytes, Thompson, Weinman & Co.) | 50 |
| Barrier (Component C), viscosity 18,716 cps: | |
| Polybutene synthetic rubber ("Indopol" H-300, Amoco Chemical) | 9.24 |
| Mineral oil (21 USP white mineral oil, Amoco Chemical) | 3.95 |
| Carbon black ("Regal" 300R, Cabot) | 0.004 |
| Calcium carbonate ("Gama-Sperse" CS-11, Georgia Marble) | 6.606 |
| Fumed silica | 0.20 |

Samples and test specimens were prepared as in EXAMPLE 1. After 3 weeks at 49° C., a cured ring had formed at the perimeter of the barrier layer, but the three components remained miscible and inspection with a probe showed no other evidence of curing.

COMPARATIVE EXAMPLE 5

(Follows Example I of Shihadeh patent)

| | Parts |
|---|---|
| Components A and B as in EXAMPLE 4 | |
| Barrier (Component C), viscosity 4,670 cps: | |
| Alkyd resin ("Aroplaz" 1351, Spencer Kellogg) | 20 |
| Carbon black ("Sterling" R, Cabot) | 7 |

Samples and test specimens were prepared as in EXAMPLE 4. After 10 days at 49° C. followed by 32 days at room temperature (about 22° C.), a cured skin had formed at the interface between Components B and C. This indicates that the material of the barrier layer (Component C) was not insoluble at 49° C. in the polymerizable material of Component B.

COMPARATIVE EXAMPLE 6

(Follows Example II of Shihadeh patent)

| | Parts |
|---|---|
| Components A and B as in EXAMPLE 4 | |
| Barrier (Component C), viscosity (1 rpm) 224,586 cps: | |
| Coal tar (K-364, Koppers) | 10 |
| Coal tar (KC-261, Koppers) | 10 |
| Titanium dioxide ("Ti-Pure" R-960, E. I. duPont de Nemours) | 7 |

Samples and test specimens were prepared as in EXAMPLE 4. A cured skin formed at the barrier, the thickness of the skin exceeding that of the original barrier layer. The colors of Components A and B changed in the vicinity of the cured skin.

COMPARATIVE EXAMPLE 7

(Follows Example III of Shihadeh patent)

| | Parts |
|---|---|
| Components A and B as in EXAMPLE 4 | |
| Barrier (Component C), viscosity 5,303 cps: | |
| Chlorinated paraffin wax ("Unichlor" 60L-60, Neville) | 20 |
| Titanium dioxide | 7 |

Samples and test specimens were prepared as in EXAMPLE 4. The barrier split and cured, and the surface of the barrier adjacent Component A became red in color.

COMPARATIVE EXAMPLE 8

(Follows Example V of Shihadeh patent)

| | Parts |
|---|---|
| Components A and B as in EXAMPLE 4 | |
| Barrier (Component C), viscosity (1 rpm) 110,214 cps: | |
| Terpene hydrocarbon resin ("Piccolyte" C-10, Hercules) | 20 |
| Titanium dioxide | 7 |

Samples and test specimens were prepared as in Example 4. A cured ring formed at the perimeter of the barrier layer and Component A became cloudy, but inspection with a probe showed no other evidence of curing.

When "Piccolyte" S-10 was substituted for "Piccolyte" C-10, no skin formed, the 3 components remained miscible, and inspection with a probe showed no evidence of curing. However "Piccolyte" S-10 has a viscosity greater than 440,000 cps (PK-II, 1 rpm). It is very difficult to dispense such a material from a hand-operated dispenser at room temperature.

COMPARATIVE EXAMPLE 9

(Follows Example VI of Shihadeh patent)

| | Parts |
|---|---|
| Components A and B as in EXAMPLE 4 | |
| Barrier (Component C), viscosity (1 rpm) 30,361 cps: | |
| Petrolatum | 20 |
| Titanium dioxide | 7 |

Samples and test specimens were prepared as in Example 4. The barrier split and cured.

COMPARATIVE EXAMPLE 10

(Follows Example VIII of Shihadeh patent)

| | Parts |
|---|---|
| Components A and B as in EXAMPLE 4 | |
| Barrier (Component C), viscosity 13,892 cps: | |
| Cellulose acetobutyrate (Eastman Chemical) | 9 |
| "Cellosolve" acetate (Union Carbide) | 21 |

Samples and test specimens were prepared as in Example 4. A cured skin formed, the thickness of which was greater than that of the original barrier layer.

EXAMPLE 11

| | Parts |
|---|---|
| Curing agent (Component A), viscosity 16,636 cps; density 1.142 g/cm$^3$: | |
| Polymercaptan resin ("Capcure" 3-800) | 1733.1 |
| Tris(2,4,6-dimethylaminomethyl)phenol | 192.8 |
| Fumed silica | 34.3 |
| Base (Component B), viscosity 16,220 cps; density 1.139 g/cm$^3$: | |
| Epoxy resin ("Epon" 828) | 898.8 |
| Epoxy resin, 2000-2500 cps @ 25° C. ("Eponex" DRH 151.1, Shell Chemical) | 894.5 |
| Epoxy resin, melting point 70-80° C. ("Epon" 1001F, Shell Chemical) | 127.75 |
| Fumed silica | 39.2 |
| Barrier (Component C), viscosity 19,029 cps; density 1.144 g/cm$^3$: | |
| Polybutene synthetic rubber | 46.2 |
| Mineral oil | 19.75 |
| Carbon black | 0.02 |
| Calcium carbonate | 33.03 |
| Fumed silica | 1.0 |

Components A and C were prepared as in EXAMPLE 1. Component B was prepared by mixing one of the liquid epoxy resins ("Eponex" DRH 151.1) with the solid epoxy resin at a temperature of about 110° C. When a uniform mixture had been obtained, the heat was removed and the remaining ingredients were added, the mixture was stirred 5 minutes and about 3000 rpm, and degassed under >25 mm Hg vacuum.

Overlap shear specimens were prepared using as the adhesives equal weights of Components A and B and various amounts of Component C, as indicated below, on FPL-Etched 2024-T3 "Alclad" aluminum panels 1.6 mm in thickness, 2.54 cm in width, overlapped 1.27 cm and assembled using 0.152 mm wire spacers in the bondline. Three test specimens were prepared for each adhesive. The specimens were cured about 16 hrs at 22° C., followed by 2 hours at 71° C. The shear strength was evaluated using a tensile tester operated at a crosshead speed of 2.5 mm/minute. Set out below are overlap shear strength values and the measured standard deviation for adhesives containing varying volume amounts of barrier layer.

The above data indicates that at up to about 15 volume % barrier layer, polybutene does not substantially reduce overlap shear strength on aluminum panels.

Using the injection head 50 of FIGS. 4-5, several size "D6L" Calmar Realex HVD dispensers (illustrated in FIGS. 1-3 of the drawing) were filled with equal amounts of Components A and B separated by 5 volume % of Component C as the barrier layer. Three increments of the contents of one of the dispensers were pumped out and tested for overlap shear strength. An average value of 23.7 MPa, standard deviation 1.75 MPa was obtained. After standing for about one day at room temperature, a slight skin that could be cleared by one stroke of the lever formed across the outlet of the dispenser.

Four additional dispensers were heated for 6 hours at 49° C., placed loose in a 17 cm×13 cm×19 cm cardboard box and then immediately (while warm) subjected at room temperature to 13 Hz, 0.5 G vibration for one hour. After then standing for a few days at room temperature, a small amount of skinned material was removed from each dispenser using two strokes of the lever. Extrudate from the third stroke of each of the four dispensers was mixed and used to make overlap shear specimens. It was observed that the overlap shear value had droppoed to 10.8 MPa, standard deviation 1.4 MPa. This reduced overlap shear value was thought to be due to a slight imbalance in the rheologies of the barrier and polymerizable materials. It was noted that at 25° C., the viscosities of Components C and A differed by about 14%, and the viscosities of Components C and B differed by about 17%. Accordingly, a further example (shown below) was prepared in which the components had higher room temperature viscosities and less than 8% room temperature viscosity mismatch.

EXAMPLE 12

| | Parts |
|---|---|
| Curing agent (Component A), viscosity 20,171 cps; density 1.186 g/cm$^3$: | |
| Polymercaptan resin ("Capcure" 3-800) | 88.2 |
| Tris(2,4,5-dimethylaminomethyl)phenol | 9.8 |
| Fumed silica | 2.0 |
| Calcium carbonate | 7.49 |
| Base (Component B), viscosity 19,755 cps; density 1.179 g/cm$^3$: | |
| Epoxy resin ("Epon" 828) | 97 |
| Fumed silica | 3 |
| Barrier (Component C), viscosity 18,716 cps; density 1.181 g/cm$^3$: | |
| Polybutene synthetic rubber | 221.5 |
| Mineral oil | 107.4 |
| Fumed silica | 10.0 |
| Carbon black | 0.1 |
| Calcium carbonate | 191.85 |

Components A, B and C were prepared and loaded into dispensers as in EXAMPLE 11 except that smaller dispensers were employed (Size "D6S" rather than size D6L, diameter 3.6 cm rather than 5 cm, volume 91 cm$^3$ rather than 159 cm$^3$). It was felt that the use of a smaller

| Vol. % Barrier | 0 | 5 | 10 | 15 | 20 | 25 | 30 | 35 |
|---|---|---|---|---|---|---|---|---|
| Overlap shear strength, psi: | 3722 | 3627 | 3691 | 3323 | 3061 | 2287 | 1918 | 1661 |
| Standard deviation, psi: | 216 | 275 | 166 | 338 | 90 | 141 | 113 | 8 |
| Overlap shear strength, MPa: | 25.6 | 25.0 | 25.4 | 22.9 | 21.1 | 15.8 | 13.2 | 11.4 |
| Std. deviation, MPa: | 1.49 | 1.89 | 1.14 | 2.33 | 0.62 | 0.97 | 0.78 | 0.06 | diameter dispenser would improve vibration resistance. Each dispenser was then placed in an oven for 7 hours at 49° C., then immediately subjected to the vibration test outlined in ASTM D999-81, Method B. This is believed to be a more severe vibration test than that employed in EXAMPLE 11.

One package containing four of the filled dispensers was tested with the dispensers standing upright, and another package was tested with the dispensers horizontal. Each package exhibited three peak resonant frequencies (as evaluated using an accelerometer attached to one dispenser within the package) and accordingly was sequentially subjected to vibration at each of those frequencies for 15 minutes. From each package was then removed the dispenser to which the accelerometer had been attached. After the extrusion outlet had been cleared by two strokes of the lever, about 6 cm$^3$ of the contents were dispensed in 3 strokes, mixed for 45 seconds, and used to make overlap shear specimens as described in EXAMPLE 11 and compared to control specimens made immediately after filling a dispenser. Overlap shear specimens were also made using material dispensed from an identical dispenser that had been held for 48 hours at 49° C. without being vibrated and then allowed to cool to room temperature. The overlap shear strengths (average of three specimens) were:

|  | Vibrated sample (upright) | Vibrated sample (horizontal) | Heated sample | Control |
|---|---|---|---|---|
| Overlap shear strength, psi: | 3923 | 3421 | 4487 | 3738 |
| Std. deviation, psi: | 161 | 100 | 153 | 69 |
| Overlap shear strength, MPa: | 27.0 | 23.0 | 30.9 | 25.8 |
| Std. deviation, MPa: | 1.1 | 0.6 | 1.05 | 0.47 |

The above data indicates that the compositions of this example should be especially resistant to vibration and heat encountered in shipping and handling.

EXAMPLE 13

|  | Parts |
|---|---|
| Components A and B as in EXAMPLE 1 | |
| Barrier (Component C), viscosity (5 rpm) 19,504 cps: | |
| Polybutene synthetic rubber | 6.88 |
| Mineral oil | 2.40 |
| Fumed silica | 0.722 |
| Carbon black | 0.0033 |

Components A, B and C were injected at a 30:30:3 volume ratio into standard screw-capped terne-plated steel tubes, volume 59 cm$^3$. The ends of the tubes were crimped. Over the course of the next month, small increments of the contents of the tubes were dispensed and mixed every few days. Although some slight skinning (believed to be due to the stirring action caused by cap replacement) occurred at the tube outlet, the contents of the tubes remained in a stable, unpolymerized state. Upon extrusion and mixing, cure took place within 5 minutes at room temperature. A partially consumed tube was stored for thirteen months at room temperature and then reexamined. Its contents remained in an uncured state but could readily be dispensed, mixed and cured within 5 minutes.

Various modifications and alterations of this invention will become apparent to those skilled in the art without departing from the scope and spirit of this invention, and it should be understood that this invention is not limited to the illustrative embodiments set forth herein.

I claim:

1. A storage stable, extrudable, polymerizable composition comprising an epoxy resin, a curing agent for said epoxy resin, and a barrier layer comprising an extrudable material selected from the group consisting of hydrogenated rosin ester, terpene phenolic resin, alpha-pinene resin and polybutene, said barrier layer being disposed in separating relationship therewith to enable said composition to be incrementally extruded without mixing the components thereof prior to and during extrusion.

2. A composition according to claim 1 wherein said resin, curing agent and barrier layer have substantially equivalent rheologies.

3. A composition according to claim 1 wherein the viscosities of said resin, curing agent and barrier layer differ from each other by no more than about 20%.

4. A composition according to claim 3 wherein the viscosities of said resin, curing agent and barrier layer differ from each other by no more than about 10%.

5. A composition according to claim 4 wherein the densities of said resin, curing agent and barrier layer differ from each other by no more than about 5%.

6. A composition according to claim 1 wherein the densities of said resin, curing agent and barrier layer differ from each other by no more than about 1%.

7. A composition according to claim 6, wherein said curing agent comprises an amine and said composition hardens in less than about 5 minutes after mixing at room temperature.

8. A composition according to claim 1, further comprising thixotropic filler in said resin and curing agent, and thixotropic filler and mineral oil in said barrier layer.

9. A composition according to claim 1 wherein said barrier layer is disposed in substantially parallel relationship to the direction of extrusion.

10. A composition according to claim 1 wherein said barrier layer is a polybutene.

11. A composition according to claim 1 comprising 100 parts by weight of said epoxy resin, from about 70 to 91 parts by weight of said curing agent, and from about 2 to 230 parts by weight of said barrier layer.

12. A composition according to claim 1 disposed in a dispenser having an opening at one end thereof to permit said composition to be extruded therefrom,
   wherein said barrier layer extends along said dispenser in a direction substantially parallel to the direction of extrusion and wherein said epoxy resin and said curing agent are situated on opposite sides of said barrier layer.

* * * * *